W. HUMISTON.
Candle Mold.
No. 1,131.
Reissued Jan. 22, 1861.
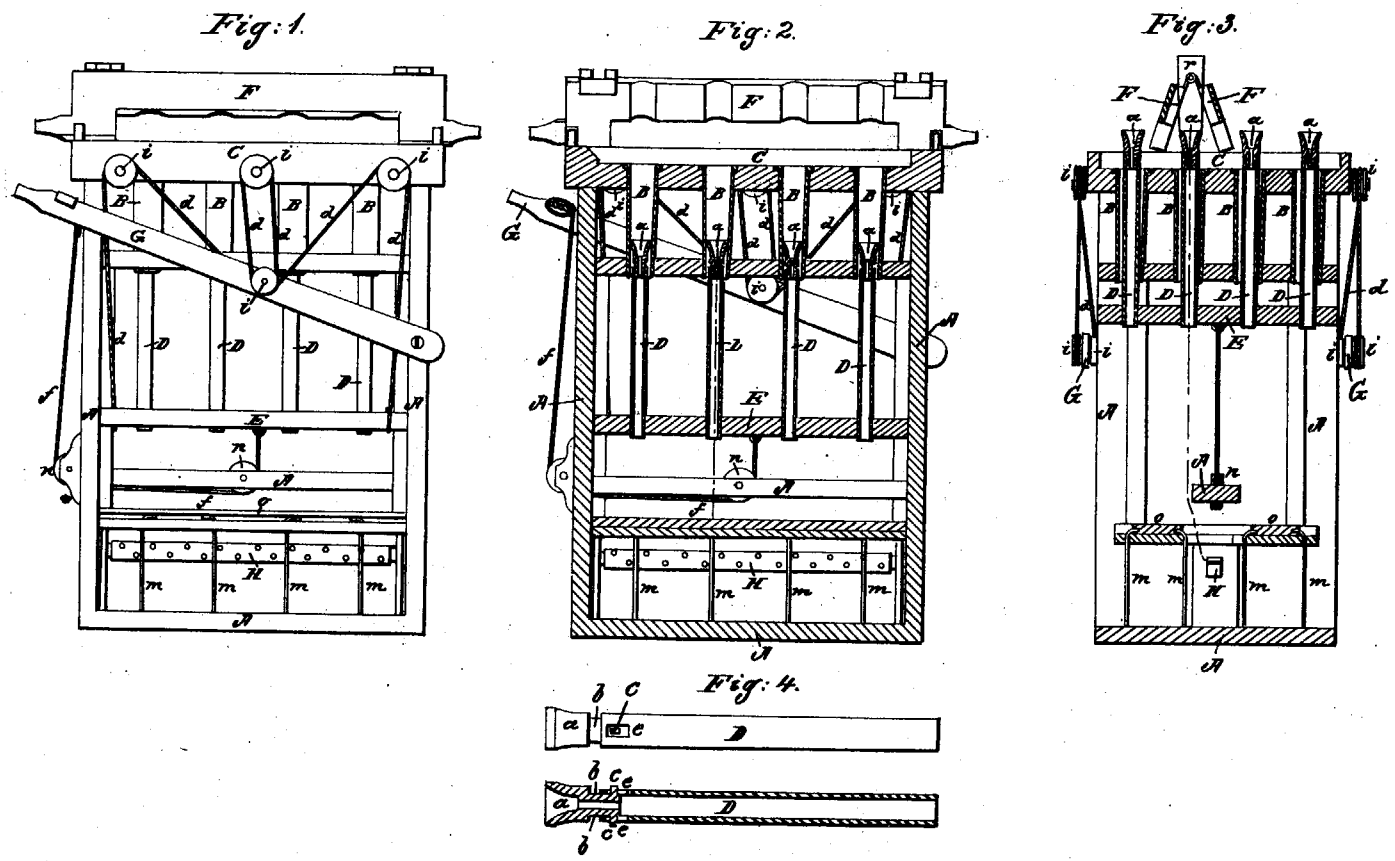
N. PETERS, Photo-Lithographer, Washington, D. C.

UNITED STATES PATENT OFFICE.

WILLIS HUMISTON, OF TROY, NEW YORK.

IMPROVEMENT IN MACHINES FOR MOLDING CANDLES.

Specification forming part of Letters Patent No. 13,334, dated July 24, 1855; Reissue No. 1,131, dated January 22, 1861.

*To all whom it may concern:*

Be it known that I, WILLIS HUMISTON, of the city of Troy, county of Rensselaer, and State of New York, did, on the 24th day of July, 1855, obtain of and from the United States of America certain Letters Patent for and upon new and useful Improvements in Candle-Mold Machines or Apparatus, and bearing the title of "Improvement in Candle-Mold Apparatus;" and for the purpose of correcting and amending the specification and re-forming the claims thereof, so as to more fully bring out my invention therein, as well as to protect my rights thereto, I do hereby declare the following to be a full and exact description of the said improvements and invention, reference being had to the accompanying drawings, and to the letters of reference marked thereon, making a part of this specification, in which—

Figure 1 represents a side view of the machine. Fig. 2 represents a vertical longitudinal section taken through one of the tiers of molds. Fig. 3 represents a vertical transverse section taken through the transverse tier of molds. Fig. 4 represents one of said molds in full and one cut through the center thereof and on an enlarged scale.

Like letters represent like parts.

The nature of my invention consists in the employment or use of a candle-tip mold connected to a drive-rod by means of a socket or universal joint, or by any means, hereinafter described, which shall prevent any separation of the said candle-tip mold from the said drive-rod, and the combination of said candle-tip mold and drive-rod with the candle mold or tube hereinafter described and set forth.

It also consists in first starting a candle from its mold with a sudden blow by means of the candle-tip mold and the drive-rod attached thereto, as hereinafter described and set forth.

It also consists in the construction and arrangement of clamps so as to hold candles by clamping them in the position in which they are ejected from their respective molds by one operation of the candle-tip mold and the drive-rod thereto attached, and then holding them until the same are ready to be removed, which is done as hereinafter described and set forth, or by any equivalent therefor.

To enable others skilled in the art to which my invention relates to make and use the same, I will here proceed to describe the construction and arrangement thereof, which is as follows, to wit:

A represents the frame of the machine, upon the top of which I arrange a reservoir, C, for the purpose of receiving and retaining any excess of tallow or other substance out of which the candles are made, after the molds in which the candles are made are filled full.

B B, &c., are the molds, in form like unto a hollow tube or cylinder, in which the candles are cast or made. The upper ends of these molds are firmly secured to the bottom or under part of the said reservoir C. They then and therefrom extend downward for a distance equal to the length of the candle required to be made, and are then firmly secured by means of a short tube screwed into a wood frame for that purpose, into the upper end of which the lower ends of the said molds somewhat extend, and are then firmly soldered so as to form a perfect joint and shoulder for the candle-tip mold, hereinafter described, to rest upon, and thereby prevent any escape of tallow or material from which the candles are made at the time of making the same and before the cooling thereof. The said wood frame may be a plank, board, or other material which will answer the purpose, and may be in any desired manner connected with the other parts of the outward frame-work containing the machinery, &c.; or said lower ends of the said candle molds or tubes may extend directly into the wood of the said frame, &c.

D D, &c., are the driver-rods, connected, as hereinafter set forth, to and with the candle-tip molds *a a*, &c., in the manner as hereinafter described and set forth. These drive-rods are arranged in and connected to the sliding frame E, and move upward the said candle-tip mold, whenever it is moved upward, by any mechanical power or operation, so as to give a quick or sudden blow to the said candle-tip mold, and thereby more easily and with a greater degree of certainty start the candles from their respective molds or tubes in which they have been cast or made.

The candle-tip molds *a a*, &c., are made in diameter of the size of the mold or tube in which the candle is made, which size, however, is the same as the lower end of the said mold or tube in all cases, thereby providing for the candles to be larger at the upper ends than at the lower ends thereof, which may be the case in order to make a tapering form. The length of the said candle-tip molds may be as desired. The upper part of these molds forms the tip of the candles during the operation of manufacture. The lower part of these molds slides into the upper end of the said drive-rods D D, &c., to any required distance, and have upon their opposite sides stops *c c*, Fig. 4, which project through slot-mortises *e e* in the said drive-rods D D, &c., same figure. *b b*, same figure, is the space allowed for the movement of the said candle tip molds *a a* and the said drive-rods D D, &c., and therefore limits the movement of each, and will not allow them to separate, but will admit and allow a sudden or quick blow to be given to the said candle-tip mold, whereby the same is communicated to the candles in their respective molds or tubes, and the same by reason thereof are quickly released from and started out of the same by the force thus attained. Then and thereafter they are easily carried upward and entirely out of their respective molds by the use of the said drive-rods and the said candle-tip mold. The joint between the said tip-mold and said drive-rod may be otherwise constructed to answer the same end and purpose.

I construct and arrange directly over each series or line of candle molds or tubes a clamp made in two parts, opening lengthwise with the same, and directly over the candle molds or tubes below, which remain stationary during the operation of casting or molding the candles below, and are only removed when the candles therein clamped are separated from the candles in the molds or tubes below by cutting the wick between each. This clamp is made of any sufficient height or depth, so as to receive and hold the candles by bringing each part together with the other in a firm and reliable perpendicular position, the same as they are received therein when ejected out of and from the candle molds or tubes in which they were cast or molded below. The candles are thus and thereby held as aforesaid, and at the same time and operation center correctly the wick for each candle next to be cast or molded below, while the said candles are thus held. These clamps do not clamp or in any wise interfere with the wick, but, on the contrary, receive and take hold of the candles directly upon any required portion or part of the surface thereof. These clamps may be seen at F, Figs. 1, 2, and 3. At Fig. 1 both parts are arranged ready for use. At Fig. 2 but one part or half appears, containing recesses for receiving the candles as ejected from the molds below. Each of these figures shows the said clamps lengthwise with the machine. At Fig. 3 each part may be seen vertically crosswise of the same.

*r* represents the candle ejected from the mold or tube below therein and ready to be clamped, which is done by bringing each part of the said clamp toward each other by means or use of any mechanical device, operated in any manner thought best. These clamps may be made to open and close in various ways and by use of various arrangements of mechanism, all of which are equivalents for closing the respective parts of the clamp upon the candles as aforesaid, or for opening the same and thereby releasing the candles when no longer desired thus to be clamped or held. This operation and manner of clamping candles removes all liability of breaking the same while the wick aforesaid is being severed or separated from the candles in the molds or wicks below by the use of any desired machinery for the purpose of cutting the same, and also gives a free and unobstructed space for the purpose of pouring or casting the candles in the molds or tubes below. After the wicks are thus severed and said candles in the clamps are separated from the candles in the molds or tubes below by means aforesaid, then the said clamps and candles therein are together removed and the candles released therefrom by opening the said clamps.

The candles in the molds or tubes B B, &c., are (when ready) driven therefrom by means and use of the drive-rods D D, &c., connected at their respective upper ends with the candle-tip mold *a*, as hereinbefore described and set forth, and firmly secured to the cross-piece or frame E at their respective lower ends. The frame E, the drive-rods D, and the candle-tip mold *a* operate together for the purpose of forcing the candles from their respective molds B. The frame E and the drive-rods D move together and give a sudden or quick blow to the said candle-tip mold *a*, thus and thereby starting the said candles from said molds or tubes B, then continuing the same onward and entirely out of the said candle-molds into the clamps, as hereinbefore represented. The said frame E may be operated by levers and pulleys; or it may be operated by means of gearing. When the candles are thus forced out of said molds and into said clamps, and the clamps are brought to bear upon and against the said candles, thus and thereby holding them in a vertical position over said molds, then the said frame E moves downward, carrying with it the said drive-rods D, which also move downward the said candle-tip molds *a* until the same reaches the bottom of the said molds B, the said candle-tip molds being connected to and with the said drive-rods D, as hereinbefore described and set forth, which being thus operated prepares the machine for another operation of casting or molding candles therein, the wicks having been carried up and ready for use at the time and operation of ejecting or forcing upward and out from said molds or tubes the candles therein made as aforesaid. The said wicks are taken from wick-balls on the spindles *m*, as shown by the red line, passing through the drive-rod D and through the candle-tip mold *a* into the candle mold or tube B, Figs. 2 and 3, and then continue onward through the said candle mold or tube B into and through the candles in the aforesaid clamps, as aforesaid, until severed or separated, as aforesaid.

The wicks may be stretched or kept in a straight line during the aforesaid operations by means and use of the shaft H, having holes therein to pass through said wick, and seen at Fig. 2; also by use and means of the candle-tip mold *a*. Any desired number of said candle molds or tubes may be arranged in one line or row, and any desired number of lines or rows thus and thereby constructed may be used, all of which shall be arranged under the construction and combination of the several parts herein described and set forth.

A machine thus constructed is more simple, requires less labor to manufacture candles, is durable and economical, and removes all liability of breaking the candles or the tips thereof during the manufacturing operation, all of which are highly important and valuable to candle-manufacturers, and of course a benefit and advantage to the public.

Having thus described my invention, what I claim, and desire to secure by Letters Patent, is—

1. The combination of the candle-tip mold *a* with the drive-rod D, as and for the purpose herein described and set forth.

2. The combination of the said candle-tip mold *a*, connected and combined with the drive-rod D, with the candle mold or tube B, as and for the purpose herein described and set forth.

3. The clamping of the candles in the position in which they are driven or forced from the molds or tubes B, and thus and thereby holding them during the operation of casting or molding candles in the said molds or tubes B directly below until the said candles in the said clamps are ready to be removed therefrom, substantially as herein described and set forth.

4. The adjusting and holding the wick (for the candles) in the center of the said molds or tubes B by the use of the said clamps F, and the candle therein firmly secured by means thereof, in connection with the said candle-tip mold *a*, attached to said drive-rod D, substantially as herein described and set forth.

In testimony whereof I have, on this 19th day of December, 1860, hereunto set my hand.

WILLIS HUMISTON.

Witnesses:
MARCUS P. NORTON,
DANIEL HALL.